United States Patent [19]

Tokar et al.

[11] 4,220,475

[45] Sep. 2, 1980

[54] RAW MIX FOR PRODUCING PORTLAND CEMENT CLINKER

[76] Inventors: Vladimir A. Tokar, ulitsa Revoljutsii, 65, kv. 6; Maria I. Zubik, ulitsa Postysheva, 9 kv. 35, both of Krivoi Rog; Anatoly I. Ternovoi, ulitsa Florentsii, 9, kv. 9, Kiev; Vladimir G. Demikhovsky, ulitsa Kosiora, 78, kv. 7, Krivoi Rog; Pavel N. Galkin, ulitsa 40 let Sovetskoi Ukrainy, 78, kv. 32, Zaporozhie; Stanislav I. Gashenko, ulitsa Gorkogo, 159, kv. 76, Zaporozhie; Alexandr A. Rogatkin, ulitsa 40 let Sovetskoi Ukrainy, 76, kv. 3, Zaporozhie; Leonid P. Khlopkov, ulitsa 40 let Sovetskoi Ukrainy, 24, kv. 11, Zaporozhie; Lidia I. Lekalova, ulitsa 40 let Sovetskoi Ukrainy, 58, kv. 39, Zaporzhie; Larisa A. Telina, ulitsa Nemirovicha-Danchenko, 14, Zaporozhie; Yakov M. Mylenko, ulitsa Stalevarov, 24, kv. 41, Zaporozhie, all of U.S.S.R.

[21] Appl. No.: 942,098

[22] Filed: Sep. 13, 1978

[51] Int. Cl.$^2$ ............................................... C04B 7/02
[52] U.S. Cl. ............................... 106/89; 106/97; 106/103; 106/118
[58] Field of Search .................. 423/89, 97, 100, 103, 423/118

[56] References Cited

U.S. PATENT DOCUMENTS

| | | | |
|---|---|---|---|
| 1,183,255 | 5/1916 | van der Toorn | 106/97 |
| 1,555,405 | 9/1925 | Eckel | 106/100 |
| 4,111,711 | 9/1978 | Kiehl | 106/97 |

*Primary Examiner*—G. O. Peters
*Attorney, Agent, or Firm*—Ladas, Parry, Von Gehr, Goldsmith & Deschamps

[57] ABSTRACT

According to the invention, the raw mix for producing portland cement clinker comprises a lime component, a clay component, an iron-containing component and a modifying agent. The latter is a cake byproduct readily available at titanium and magnesium works. The percentage by weight composition of the mix is as follows:

| | |
|---|---|
| lime component, | 88.3 to 77.8 |
| clay component, | 9.2 to 11.2 |
| iron-containing component, | 2.0 to 5.0 |
| modifying agent, | 0.5 to 6.0 |

The raw mix according to the invention possesses better properties than conventional mixes. For example, its plasticity is 140 to 160 units, and the degree of mineralization is as high as 19 percent.

1 Claim, No Drawings

4,220,475

RAW MIX FOR PRODUCING PORTLAND CEMENT CLINKER

FIELD OF THE INVENTION

The present invention relates to the production of building materials and the cement industry. More particularly, the invention relates to raw mixes for producing portland cement clinker.

Such mixes must meet a number of stringent requirements. They must possess a desired combination of physico-chemical and mechanical properties, including a certain degree of plasticity, strength and porosity, so as to be fit for the production of quality clinker.

BACKGROUND OF THE INVENTION

There are known raw mixes for producing portland cement clinker, which contain various modifying agents in addition to their basic ingredients. The modifying agents are meant to control the properties of the mixes and those of the clinker into which they are made.

Modifying agents used in the production of portland cement clinker include a number of natural products, such as diatomite, tufa and pumice. However, it is more economical to use waste products and byproducts of certain industries, such as metallurgy, the chemical industry, etc.

There are known raw mixes for producing portland cement clinker, which comprise a carbonate component, a clay component and an iron-containing component. The modifying agent is blast furnace dust (cf. Yu. M. Butt, V.V. Timashev, "Portlandtsementny clinker" /"Portland Cement Clinker"/, Gosudarstvennoye Izadatelstvo literatury po stroitelstvu, arkhitekture i stroitelnym materialam /State Publishing House for Literature on Building, Architecture and Building Materials/, Moscow, 1967). The modifying agent may also be phosphogypsum which is a byproduct of the phosphoric acid production (cf. USSR Inventor's Certificate No. 501,047), or a byproduct of the production of soda containing 70 percent of $CaCl_2$ (cf. USSR Inventor's Certificate No. 326,152).

The above raw mixes are extensively used to produce clinker of a sufficiently high strength and degree of mineralization, as well as a reduced porosity.

In addition, modifying agents help to increase the extent of decarbonization of raw mixes and intensify the firing process.

However, none of the conventional modifying agents can produce a combination of desired properties in a raw mix and clinker into which it is made.

There is known a raw mix for producing portland cement, comprising a carbonate component, a clay component, an iron containing component and a mineralizer which is a mixture of magnesium carbonate and calcium sulfate. The percentage by weight composition of the mix under review is as follows:

| lime component, | 70 to 82 |
| clay component, | 15 to 19 |
| iron-containing component, | 2 to 5 |
| modifying agent, | 1 to 10 |

(cf. USSR Inventor's Certificate No. 485,986).

This mix possesses a whole complex of useful properties; besides, the above-mentioned modifier makes it possible to reduce the firing temperature. Yet the mineralization and plasticity of the mix are inadequate, which equally applied to the strength and porosity of the clinker produced from this mix.

SUMMARY OF THE INVENTION

It is an object of the present invention to provide a raw mix for producing portland cement clinker, which would feature a combination of useful properties, including an increased strength, plasticity and degree of mineralization, and a reduced porosity.

To the accomplishment of the foregoing and related objects, the invention consists in providing a raw mix comprising a lime component, a clay component, an iron-containing component and a modifying agent, which is characterized, according to the invention, in that the modifying agent is a cake byproduct of the titanium and magnesium production, the percentage by weight composition of the mix being as follows:

| lime component, | 88.3 to 77.8 |
| clay component, | 9.2 to 11.2 |
| iron-containing component, | 2.0 to 5.0 |
| modifying agent, | 0.5 to 6.0 |

The lime component may be limestone, chalk or marl. The clay component is different types of clays and loams. The iron-containing component is pyrite cinders, hematite or ore dust.

As stated above, the modifying agent is cake which is a byproduct readily available at titanium and magnesium works.

Cake is a multicomponent pasty mixture with a moisture content of 60 to 70 percent.

The percentage by weight composition of dry cake is as follows:

| C, | 2.0 to 6.0 | MgO, | 5.1 to 9.0 |
| $TiO_2$, | 10.0 to 13.0 | MnO, | 0.18 to 30.0 |
| FeO, | 2.0 to 10.0 | | |
| $Al_2O_3$, | 7.0 to 10.0 | $V_2O_5$ | 0.12 to 0.40 |
| $SiO_2$, | 7.0 to 30.0 | $Cr_2O_3$, | 0.30 to 0.80 |
| CaO, | 15.0 to 30.0 | S, | 0.09 to 1.5 |
| $CaCl_2$, | 5.0 to 13.0 | Cl, | 3.0 to 10.0 |
| $CaCO_3$, | 20.0 to 50.0 | | |

This type of cake also includes small amounts of rare earths.

The multicomponent composition of the cake accounts for good properties of the raw mix and clinker. For example, ions of chlorine are conducive to the formation of crystal nuclei and the growth of crystals of minerals, which, in turn, intensifies the clinker formation process. Ions of chlorine and CaO have a positive effect on the plasticity of the raw mix, as well as on the strength and porosity of granules.

$Al_2O_3$ enhances the reactivity of the mix, because as a free oxide, $Al_2O_3$ is a finely dispersed material and thus accounts for improved strength characteristics of the raw mix and clinker.

The raw mix according to the invention possesses better physico-chemical and mechanical properties than conventional mixes used for the production of portland cement clinker. For example, the plastic index of the mix according to the invention is 140 to 160 units, which is 10 to 30 units more than the plastic index of the raw mix containing a mixture of magnesium carbonate and calcium sulfate as the modifying agent. The presence of free CaO in the mix of this invention accounts for a 5- to 19-percent increase in the degree of mineralization.

The clinker produced from this mix features a high density, keeping in mind that its porosity amounts only to 15 to 21 percent, as well as an increased strength, keeping in mind that its compression strength is as high as 450 to 500 kg/cm$^2$.

Finally, the production of clinker from the raw mix according to the invention does not necessitate high firing temperatures.

DETAILED DESCRIPTION OF THE INVENTION

The method of preparing the raw mix according to the invention is quite simple and is carried out as follows.

The crushing of the lime component is done in two steps. First, it is passed through a jaw crusher and then through a hammer crusher. The crushed lime component is then passed through a uniflow drum drier to reduce the moisture content to 5 percent.

The clay component and cake are charged into another drum drier where the moisture content of the mixture is brought down to the same level of 5 percent. The dry material is transferred from the two drum driers to a ball mill where the iron-containing component, which needs no preprocessing, is added to the mixture. The raw mix thus produced is placed in correction silos to ensure a uniform chemical composition of the mixture. In some cases the mix has to be granulated before it is turned into clinker. For this purpose the mix is passed through granulators, for example, through disc-type nodulizers where water is fed by spray jets.

A better understanding of the present invention will be had from a consideration of the following examples illustrating preferred embodiments thereof.

EXAMPLE 1

The percentage by weight composition of the raw mix is as follows:

| | |
|---|---|
| limestone, | 88.3 |
| clay, | 9.2 |
| ore dust, | 2.0 |
| cake, | 0.5 |

To produce such mix, the lime component is successively passed through a jaw crusher and a hammer crusher.

The ground lime component is then dried in a uniflow drum drier to reduce the moisture content to 5 percent. The clay component and cake, which is a byproduct of the magnesium and titanium production, are passed through another drum drier to reduce the moisture content to the same level of 5 percent.

The dry material is transferred from both drums to a ball mill where ore dust is added. The mix thus produced is kept in correction silos to ensure a uniform chemical composition, whereafter it is passed through a dic-type nodulizer where water is fed by spray jets. The size of the granules is 8 to 12 mm.

The properties of the mix are as follows:

| | |
|---|---|
| plasticity, | 140 units |
| compression strength of granules, | 4 kg |
| free fall test (percentage of intact granules after a free fall from a height of 1 m), | 85% |
| porosity, | 23% |

The above mix makes it possible to reduce the temperature at which the clinker formation is completed from 1,470° C. to 1,400° C.

Example 2

The percentage by weight composition of the raw mix is as follows:

| | |
|---|---|
| limestone, | 83 |
| clay, | 10 |
| pyrite cinders, | 3 |
| cake | 4 |

The mix is prepared as described in Example 1. The properties of the mix are as follows:

| | |
|---|---|
| plasticity, | 150 units |
| compression strength of granules, | 5 kg |
| free fall test (percentage of intact granules after a free fall from a height of 1 m), | 90% |
| porosity, | 20% |

The above mix makes it possible to reduce the temperature at which the clinker formation is completed from 1,470° C. to 1,350° C.

Example 3

The percentage by weight composition of the raw mix is as follows:

| | |
|---|---|
| limestone, | 77.8 |
| clay, | 11.2 |
| ore dust, | 5 |
| cake, | 6 |

The mix is prepared as described in Example 1. The properties of the mix are as follows:

| | |
|---|---|
| plasticity, | 162 units |
| compression strength of granules, | 9 kg |
| free fall test (percentage of intact granules after a free fall from a height of 1 m), | 95% |
| porosity, | 18% |

The above mix makes it possible to reduce the temperature at which the clinker formation is completed from 1,470° C. to 1,300° C.

What is claimed is:

1. A raw mix for producing portland cement clinker, comprising a lime component, a clay component, an iron-containing component, and a modifying agent which is a cake by-product of the titanium and magnesium production, the percentage by weight composition of the mix being as follows:

| | |
|---|---|
| lime component, | 88.3 to 77.8 |
| clay component, | 9.2 to 11.2 |
| iron-containing component | 2.0 to 5.0 |
| modifying agent, | 0.5 to 6.0 | wherein said modifying agent comprises a cake having a dry percentage by weight composition as follows:

| | |
|---|---|
| C, | 2.0 to 6.0 |
| TiO$_2$, | 10.0 to 13.0 |
| FeO, | 2.0 to 10.0 |
| Al$_2$O$_3$, | 7.0 to 10.0 |
| SiO$_2$, | 7.0 to 30.0 |
| CaO, | 15.0 to 30.0 |

-continued

| | |
|---|---|
| CaCl$_2$, | 5.0 to 13.0 |
| CaCO$_3$, | 20.0 to 50.0 |
| MgO, | 5.1 to 9.0 |
| MnO, | 0.18 to 30.0 |
| V$_2$O$_5$, | 0.12 to 0.40 |
| Cr$_2$O$_3$ | 0.30 to 0.80 |
| S, | 0.09 to 1.5 |
| Cl, | 3.0 to 10.0 |

* * * * *